United States Patent
Perez Barrera (10) Patent No.: US 10,384,514 B2
(45) Date of Patent: Aug. 20, 2019

(54) AUTONOMOUS VEHICLE AIR REGISTER CONTROL

(71) Applicant: FORD GLOBAL TECHNOLOGIES, LLC, Dearborn, MI (US)

(72) Inventor: Oswaldo Perez Barrera, Texcoco (MX)

(73) Assignee: Ford Global Technologies LLC, Dearborn, MI (US)

( * ) Notice: Subject to any disclaimer, the term of this patent is extended or adjusted under 35 U.S.C. 154(b) by 94 days.

(21) Appl. No.: 15/829,932

(22) Filed: Dec. 3, 2017

(65) Prior Publication Data
US 2019/0168575 A1  Jun. 6, 2019

(51) Int. Cl.
*B60H 1/00* (2006.01)
*B60R 16/00* (2006.01)
(Continued)

(52) U.S. Cl.
CPC ..... *B60H 1/00871* (2013.01); *B60H 1/00742* (2013.01); *B60H 1/00985* (2013.01);
(Continued)

(58) Field of Classification Search
CPC .. B60H 1/00; B60H 1/00871; B60H 1/00742; B60H 1/00985; B60R 16/00; B60R 16/037; G06F 3/00; G06F 3/04817; G06F 3/0488
See application file for complete search history.

(56) References Cited

U.S. PATENT DOCUMENTS 6,789,607 B1 *  9/2004  Jun ................ B60H 1/00678
                                                   165/203
2012/0116608 A1  5/2012  Park et al.
(Continued)

FOREIGN PATENT DOCUMENTS

| CN | 203104522 U | 7/2013 |
| CN | 104057801 A | 9/2014 |
| KR | 20150075788 A | 7/2015 |

OTHER PUBLICATIONS

English Machine Translation of KR20150075788A.
(Continued)

*Primary Examiner* — Yonel Beaulieu
(74) *Attorney, Agent, or Firm* — Vichit Chea; King & Schickli PLLC (57) ABSTRACT

A method for controlling an airflow in a passenger cabin of an autonomous vehicle includes providing an input indicative of an occupied passenger seat to a controller in operative communication with a power-actuated vehicle air register. On determination of the occupied passenger seat, the controller redirects an airflow from the air register towards the occupied passenger seat. The controller may display icons to allow a user to provide the input indicative of the occupied passenger seat. The controller may also display other icons to allow the user to control the power-actuated vehicle air register. At least one imager in communication with the controller and disposed adjacent to the power-actuated vehicle air register may be included to provide an image of a selected portion of a passenger's body to the controller whereby a movement of the passenger in the passenger cabin can be tracked. Systems for accomplishing the method are provided.

12 Claims, 6 Drawing Sheets

(51) Int. Cl.
  *G06F 3/00* (2006.01)
  *B60R 16/037* (2006.01)
  *G06F 3/0488* (2013.01)
  *G06F 3/0481* (2013.01)
  *B60H 1/24* (2006.01)
  *B60H 1/34* (2006.01)

(52) U.S. Cl.
  CPC ............... *B60H 1/24* (2013.01); *B60H 1/34* (2013.01); *B60R 16/037* (2013.01); *G06F 3/0488* (2013.01); *G06F 3/04817* (2013.01)

(56) References Cited

U.S. PATENT DOCUMENTS

| | | | | |
|---|---|---|---|---|
| 2012/0315835 | A1* | 12/2012 | Maranville | B60H 1/00742 454/75 |
| 2014/0015977 | A1* | 1/2014 | Taylor | B60C 23/0408 348/148 |
| 2014/0100716 | A1 | 4/2014 | Kawai et al. | |
| 2015/0129192 | A1 | 5/2015 | Boss et al. | |
| 2016/0363340 | A1 | 12/2016 | Shikii et al. | |
| 2017/0115826 | A1* | 4/2017 | Pryor | G06F 3/0425 |
| 2017/0158023 | A1* | 6/2017 | Stevanovic | B60H 1/00771 |
| 2017/0291469 | A1* | 10/2017 | Romero Regalado | B60H 1/00871 |
| 2017/0326944 | A1* | 11/2017 | Carlesimo | B60H 1/00657 |
| 2018/0009288 | A1* | 1/2018 | Bhasin | B60H 1/00742 |
| 2018/0088770 | A1* | 3/2018 | Brombach | B60K 35/00 |
| 2018/0091085 | A1* | 3/2018 | Tamagaki | H02P 29/40 |

OTHER PUBLICATIONS

English Machine Translation of CN104057801A.
English Machine Translation of CN203104522U.
Christian Plagemann, Varun Ganapathi, Daphne Koller, Sebastian Thrun, Real-Time Identification and Localization of Body Parts from Depth Images, pp. 1-6, Artifical Intelligence Laboratory, Stanford University, Stanford, CA, USA.
Mun Wai Lee Nad Ram Nevatia, Body Part Detection for Human Pose Estimation and Tracking, Institute for Robotics and Intelligent Systems, Univ. of Southern California, Los Angeles, CA, 2017, pp. 1-8, Computer Society, IEEE Workshop on Motion and Video Computing (WMVC'07).
Dantone, Matthias,Real Time Detection of Human Body and Face Parts, ETH Zurich, Doctral Thesis, 2014, pp. 1-172, https://doi.org/10.3929/ethz-a-010293976.

* cited by examiner

AUTONOMOUS VEHICLE AIR REGISTER CONTROL

TECHNICAL FIELD

The present disclosure generally relates to autonomous vehicles. More specifically, the present disclosure relates to control of air register orientation in an autonomous vehicle.

BACKGROUND

As is known, fully autonomous vehicles (also variously referred to as driverless vehicles, self-driving vehicles, and robotic cars) are vehicles capable via a navigation system of sensing their environment and navigating between destinations without requiring human input or control. At a high level, the navigation system typically comprises a combination of on-board and remotely located systems and/or services, and may be variously based on radar, laser light, global positioning satellite (GPS), odometry, and computer vision technologies. Autonomous vehicles further typically include control systems capable of analysing sensory data to distinguish between different vehicles encountered on the path of travel, to allow plotting a course between locations. Fully autonomous (i.e., vehicles lacking any means of driver input) vehicle technology when fully developed and implemented will provide numerous advantages, including without intending any limitation reductions in traffic gridlock and improvements in traffic flow, including reductions in traffic collisions and associated injuries and economic cost, increased travel options for physically impaired individuals, reduced requirements for parking capacity, reductions in crime, and others.

Because no driver will be required in a fully autonomous vehicle, modifications to the current internal configuration of a vehicle passenger cabin will be possible. For example, the lack of a requirement for a steering wheel or other means of controlling the vehicle path of travel and the concomitant elimination of the requirement of a dedicated driver's seat will allow making significant changes to the current interior layout of a vehicle passenger cabin such as repositioning the vehicle seats in any way desired. In a fully autonomous vehicle the traditional forward-facing seat arrangement may well become obsolete. Likewise, traditional "front seat" and "back seat" arrangements will likely be eliminated. In turn, elimination of traditional forward-facing front seat and back seat arrangements will result in fewer restrictions on passenger location during a trip, i.e. a passenger may begin a trip in one seat, but may choose mid-trip to simply get up and change seats. The traditional vehicle-forward dash panel could be eliminated. Likewise, the control panels, switches, knobs, etc. that are currently typically mounted in a dash panel could be replaced by centrally-located or seat-mounted control panels, switches, knobs, etc., or even by controls disposed in mobile devices such as smart phones, tablets, key fobs, smart keys, etc. carried by a passenger.

Vehicle climate control systems typically include air registers adapted to direct conditioned airflow from the vehicle heating, ventilation, and air-conditioning (HVAC) system towards a passenger. Such air registers typically include a louver or vane arrangement which may be manually or automatically adjusted to direct airflow towards a passenger occupying a vehicle seat according to the passenger's preference. Because of vehicle seating rearrangements made possible in fully autonomous vehicles, reconfiguration/repositioning of other vehicle elements such as the air registers will also likely be required. In turn, systems and methods for controlling such repositioned air registers in fully autonomous vehicles will also likely be required.

This disclosure solves this and other problems by providing methods and systems for controlling air register orientation, i.e. direction of airflow, in autonomous vehicles.

SUMMARY

In accordance with the purposes and benefits described herein, in one aspect of the present disclosure a method for controlling an airflow in a passenger cabin of an autonomous vehicle is provided comprising, by way of a human-machine interface (HMI), providing an input indicative of an occupied passenger seat to a controller comprising a processor, memory, and storage, the controller being in operative communication with a power-actuated air register. On receipt of the input, the controller redirects an airflow from the power-actuated air register towards the occupied passenger seat. The controller is configured to, by way of the HMI: i) display a set of icons whereby a user may provide the input indicative of the occupied passenger seat, and ii) display another set of icons whereby the user may control a plurality of power-actuated airflow-directing elements of the power-actuated air register.

In embodiments, the HMI may be included in a device selected from the group consisting of a central control panel, a plurality of passenger-seat-mounted control panels, and a plurality of user-carried mobile devices. The plurality of power-actuated airflow-directing elements of the power-actuated air register may be selected from one or more of a plurality of substantially vertically-oriented pivoting vanes, a plurality of substantially horizontally-oriented pivoting vanes, and a power-actuated air register shut-off door.

In other embodiments, the method includes providing at least one imager in communication with the controller and disposed adjacent to the power-actuated vehicle air register, to provide an image of a selected portion of a passenger to the controller. According to the method, the controller is configured to orient the image of the selected portion of the passenger on a grid comprising a plurality of vertical and horizontal grid lines, each vertical and horizontal grid line respectively corresponding to a degree of motion of the plurality of substantially vertically-oriented vanes and the substantially horizontally-oriented vanes, to determine an orientation of the plurality of substantially vertically-oriented vanes and the substantially horizontally-oriented vanes and/or a movement of the selected portion of the passenger.

The controller is further configured to pivot at least one of the plurality of substantially vertically-oriented vanes and the plurality of substantially horizontally-oriented vanes to direct an airflow from the power-actuated vehicle air register towards the selected portion of the passenger's body. On a determination by the controller that the selected portion of the passenger's body has moved from a first passenger seat to a second passenger seat, the controller is configured to: i) translate the shut-off door of a power-actuated air register closest to the first passenger seat to a closed position; ii) translate the shut-off door of a power actuated air register closest to the second passenger seat to an open position; and iii) pivot at least one of the plurality of substantially vertically-oriented vanes and the plurality of substantially horizontally-oriented vanes of the power-actuated air register closest to the second passenger seat to direct an airflow towards the selected portion of the passenger's body.

In another aspect of the disclosure, a system for controlling an airflow in a passenger cabin of an autonomous vehicle is provided, comprising a plurality of power-actuated air registers, a controller comprising a processor, memory, and storage in operative communication with the plurality of power-actuated air registers, and a human-machine interface (HMI) in communication with the controller and comprising a touch screen adapted for providing inputs to the controller indicative of an occupied passenger seat. The controller is configured to direct an airflow from one or more of the plurality of power-actuated air registers toward the occupied passenger seat on receiving the input. The controller is further configured to, by way of the HMI: i) display a set of icons whereby a user may provide the input indicative of the occupied passenger seat; and ii) display another set of icons whereby the user may control a plurality of power-actuated airflow-directing elements of the plurality of power-actuated air registers. The HMI and plurality of power-actuated airflow-directing elements are substantially as described above.

In embodiments, the system further includes at least one imager in communication with the controller and disposed adjacent to each one of the plurality of power-actuated vehicle air registers, the at least one imager being configured to provide an image of a selected portion of a passenger to the controller. The controller may be further configured to orient the image of the selected portion of the passenger's body on a grid comprising a plurality of vertical and horizontal grid lines, each vertical and horizontal grid line respectively corresponding to a degree of motion of the plurality of substantially vertically-oriented vanes and the plurality of substantially horizontally-oriented vanes, to determine an orientation of the plurality of substantially vertically-oriented vanes and the substantially horizontally-oriented vanes and/or a movement of the selected portion of the passenger. The controller may be further configured to pivot at least one of the plurality of substantially vertically-oriented vanes and the plurality of substantially horizontally-oriented vanes to direct an airflow from the power-actuated vehicle air register towards the selected portion of the passenger.

In embodiments, the controller is further configured to, on determining that the selected portion of the passenger has moved from a first passenger seat to a second passenger seat: i) translate the shut-off door of a power-actuated vehicle air register closest to the first passenger seat to a closed position; ii) translate the shut-off door of a power actuated vehicle air register closest to the second passenger seat to an open position; and iii) pivot at least one of the plurality of substantially vertically-oriented vanes and the plurality of substantially horizontally-oriented vanes of the power-actuated vehicle air register closest to the second passenger seat to direct an airflow towards the selected portion of the passenger.

In yet another aspect of the disclosure, a system for controlling an airflow in a passenger cabin of an autonomous vehicle is provided, comprising a plurality of power-actuated air registers each comprising a plurality of power-actuated airflow-directing vanes and a power-actuated shut-off door, a controller comprising a processor, memory, and storage in operative communication with the plurality of power-actuated air registers, a human-machine interface (HMI) in communication with the controller and comprising a touch screen adapted for providing inputs to the controller indicative of an occupied passenger seat, and at least one imager in communication with the controller and disposed adjacent to each one of the plurality of power-actuated vehicle air registers, the at least one imager having a fixed field of view and being configured to provide to the controller an image of a selected portion of a passenger that is positioned in the occupied passenger seat. The controller is configured to direct an airflow from one or more of the plurality of power-actuated air registers towards the selected portion of the passenger on receiving the input.

In embodiments, the plurality of power-actuated air registers and the at least one imager are disposed on or in a B-pillar or a B-pillar trim piece of the autonomous vehicle. The controller may be further configured to, by way of the HMI: i) display a set of icons whereby a user may provide the input indicative of the occupied passenger seat; and ii) display another set of icons whereby the user may control one or both of the plurality of power-actuated airflow-directing vanes and the power-actuated shut-off door.

In embodiments, the controller is further configured to orient the image of the selected portion on the passenger's body to a grid comprising a plurality of vertical and horizontal grid lines, each vertical and horizontal grid line respectively corresponding to a degree of motion of the plurality of power-actuated airflow-directing vanes. On determining a movement of the selected portion of the passenger from a first passenger seat to a second passenger seat, the controller is further configured to: i) translate a shut-off door of a power-actuated vehicle air register closest to the first passenger seat to a closed position; ii) translate a shut-off door of a power actuated vehicle air register closest to the second passenger seat to an open position; and iii) pivot the plurality of power-actuated airflow-directing vanes closest to the second passenger seat to direct an airflow towards the selected portion of the passenger.

In the following description, there are shown and described embodiments of the disclosed methods and systems for controlling a power-actuated air register in an autonomous vehicle. As it should be realized, the described methods and associated systems are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed methods and systems for controlling a power-actuated air register in an autonomous vehicle, and together with the description serve to explain certain principles thereof. In the drawings.

Reference will now be made in detail to embodiments of the disclosed methods and systems for controlling a power-actuated air register in an autonomous vehicle, examples of which are illustrated in the accompanying drawing figures.

DETAILED DESCRIPTION

Preliminarily, various methods and systems for controlling navigation and other functions of autonomous vehicles are known. A full description of such methods and systems exceeds the scope of the present disclosure, and is not undertaken herein. At a high level, however, as described above an autonomous vehicle typically includes at least a navigational control system which may in turn include at least a system for determining a geographical position of the vehicle, for example a Global Positioning Satellite system. The elements of a vehicle climate control system are likewise well known. However, a vehicle climate control system typically includes at least an HVAC system which in turn comprises at least an HVAC evaporator core, an HVAC blower in fluid communication with an HVAC air distribution door and an HVAC duct system via which conditioned airflow is introduced into the vehicle passenger cabin by way of one or more air registers.

Further, the presently described methods and attendant systems for controlling a climate control system of an autonomous vehicle are primarily described in the context of controlling an air register positioned in a pillar element of a vehicle, specifically the B-pillar. However, the skilled artisan will readily appreciate that the described methods and systems could equally be positioned elsewhere in the vehicle passenger cabin interior, for example in roof- or headliner-mounted consoles, in center consoles, and elsewhere. Still more, it will be appreciated by the skilled artisan that the presently described methods and attendant systems for controlling a power-actuated air register in an autonomous vehicle are equally applicable to fully autonomous vehicles, partially autonomous vehicles, and non-autonomous vehicles. Accordingly, the present disclosure should not be taken as limiting in this regard.

Figure 1:
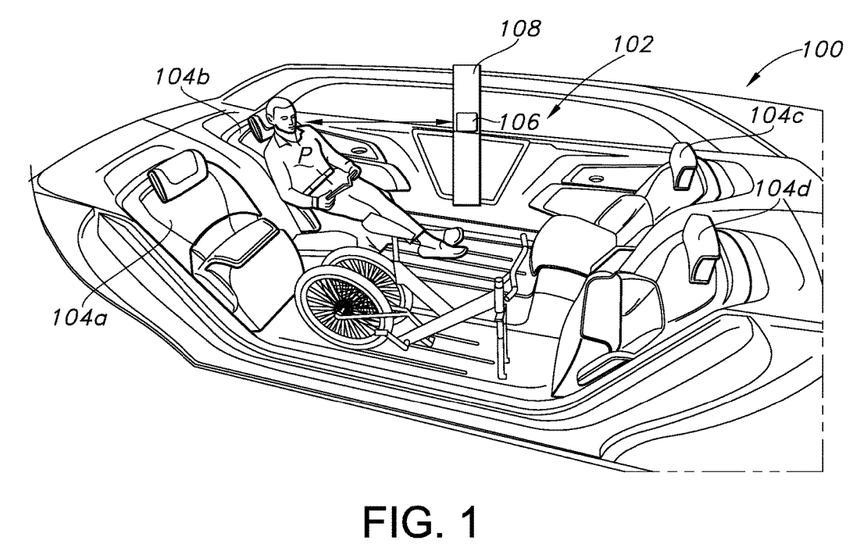
FIG. 1 illustrates an embodiment of a passenger cabin of an autonomous vehicle.

FIG. 1 illustrates one potential interior design for an autonomous vehicle 100 passenger cabin 102. As shown, the traditional "front seat" and "back seat" arrangement is replaced by vehicle seats 104 arranged whereby passengers P face one another, for convenience in interacting if desired. While four seats 104a-d are shown, it will be appreciated that more or fewer seats 104 may be included according to vehicle size, model, etc. For example, a longer vehicle 100 could accommodate a greater number of seats 104. One or more air registers 106 are disposed substantially centrally in the vehicle 100, in the depicted embodiment being positioned in the vehicle B-pillar 108.

Figure 2:
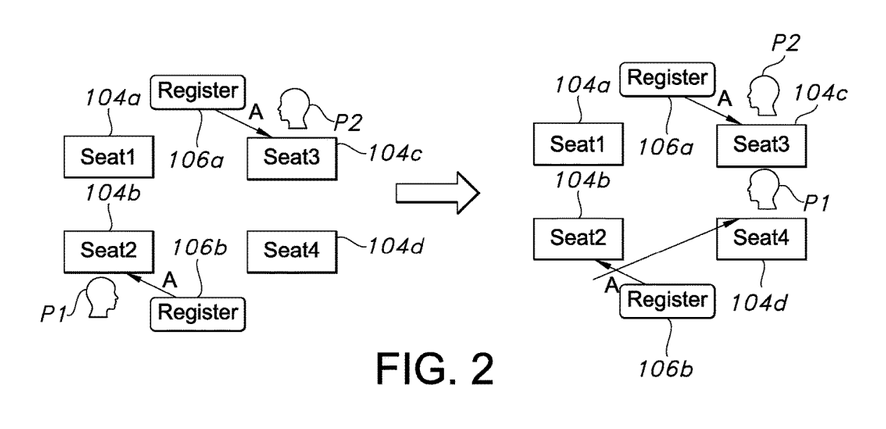
FIG. 2 schematically shows passengers changing seats in the passenger cabin of FIG. 1.

With reference to FIG. 2, passengers P1, P2 may begin a trip in particular seats, for example in seats 104a and 104c as shown, and the airflow A from air registers 106a, 106b would be directed at those particular seats. However, one or more passengers may change seats mid-trip. For example, as shown passenger P1 may move to seat 104d but the airflow A from air register 106b would still be directed at seat 104a. This could be changed manually by actuating an air register 106 slider bar or other knob (not shown), but particularly in larger vehicles wherein the distance between a vehicle seat 104 and the vehicle B-pillar 108 is greater, such manual reconfiguration may not be convenient.

To solve this and other problems, a system is provided by which the presently described methods for controlling an air register 106 disposed in a passenger cabin 102 of an autonomous vehicle 100 may be implemented. As shown schematically in FIG. 3, an autonomous vehicle 100 includes a passenger cabin 102, an HVAC system shown generally as reference number 110, and HVAC ducts 112 directing conditioned air from the HVAC system to air registers 106a, 106b carried by B-pillars 108a, 108b. At least one human-machine interface (HMI) 114 is provided for controlling an airflow exiting air registers 106a, 106b.

Figure 3:
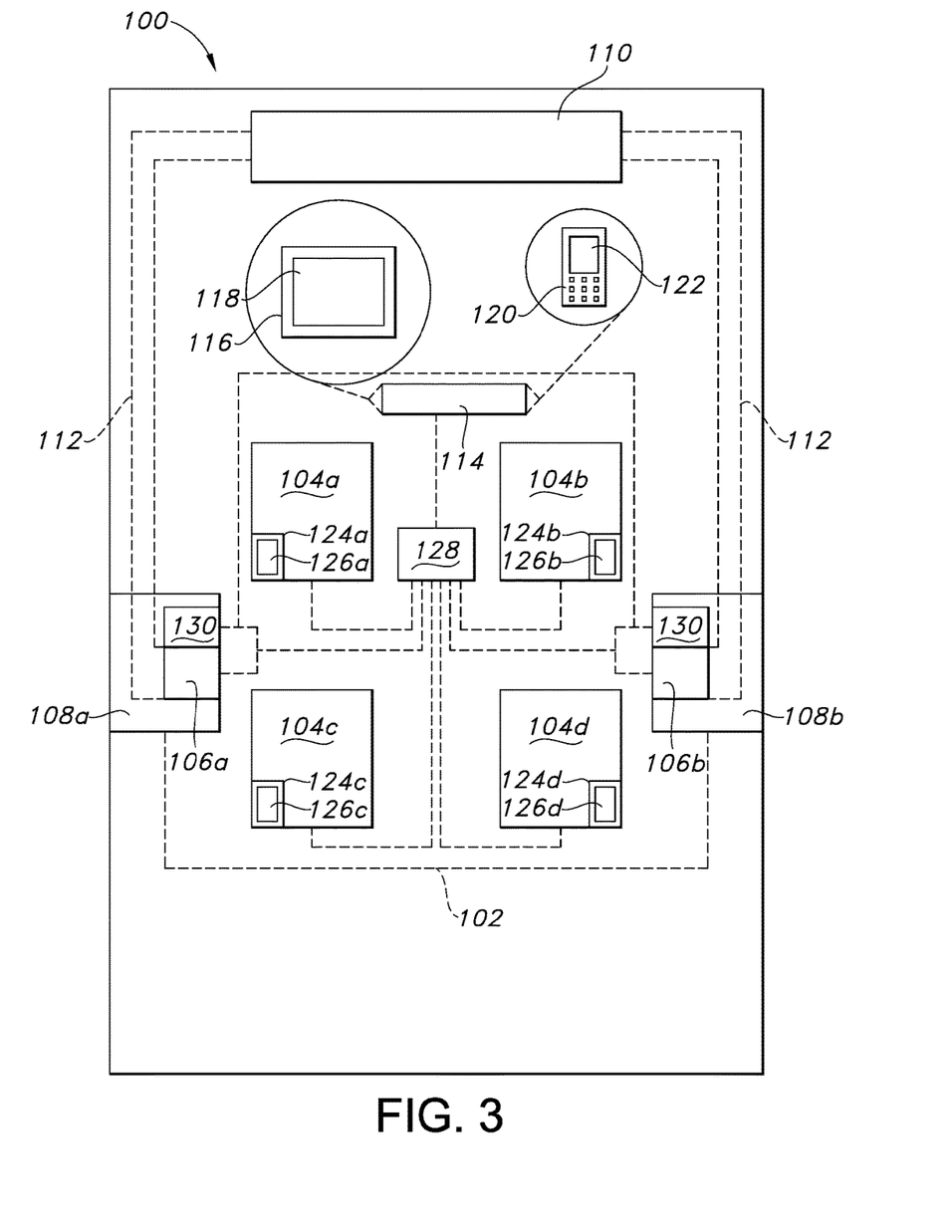
FIG. 3 shows an embodiment of a system for controlling an air register disposed in the passenger cabin of FIG. 1.

As will be appreciated, the HMI 114 may take a variety of forms. In one possible embodiment as shown, the HMI 114 is provided as a control panel 116 including a display screen 118, accessible to all passengers in the vehicle 100. In another possible embodiment, HMI 114 may be associated with a user's mobile device 120 (such as a smartphone, tablet, or other mobile device) and via the mobile device display screen 122. In still yet another embodiment, HMI 114 may be provided by individual control panels 124a-d associated with each passenger seat 104a-d, each control panel having a display screen 126a-d. In the illustrated embodiments, display screens 118, 122, and 126a-d may be touch screens of known design, although alternative embodiments are contemplated.

The HMI 114 is in operative communication with at least one controller 128 comprising at least one processor, at least one memory, and storage. As will be appreciated, the controller 128 may be a dedicated electronic control unit (ECU) which in turn is in operative communication with a central controller such as the basic control module (BCM), or the controller 128 may be comprised in the BCM itself. In turn, the controller 128 is in operative communication with each air register 106a, 106b. This may comprise direct control of actuators associated with each air register 106a, 106b as will be described in greater detail below, or may comprise communication of the controller 128 with a dedicated ECU 130 which in turn controls such actuators.

Figure 4A:
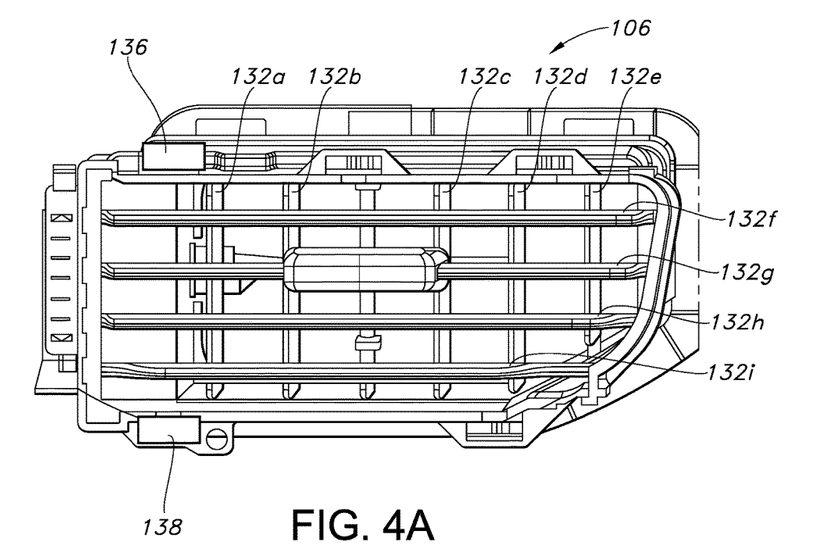
FIG. 4A schematically shows a front view of an embodiment of an air register for use in the system of FIG. 3.
Figure 4B:
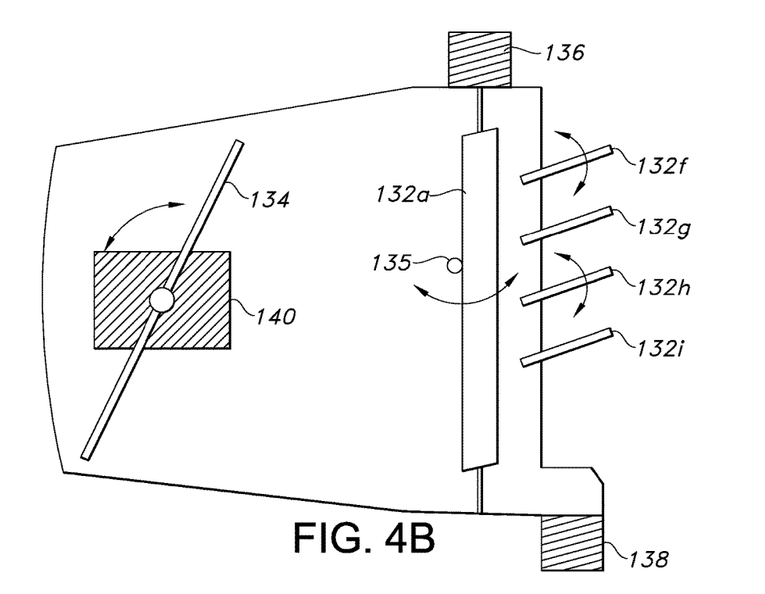
FIG. 4B schematically shows a side view of the air register of FIG. 4A.

With reference to FIGS. 4A and 4B, the described system for controlling an air register 106 disposed in a passenger cabin 102 of an autonomous vehicle 100 also includes one or more air registers 106 configured for automatic manipulation of airflow. Specifically, as shown in the drawing figure each air register 106 includes a plurality of airflow-directing vanes 132. The air registers 106 are configured and dimensioned for insertion into and attachment to cooperating apertures (not shown) in B-pillars 108a, 108b (not shown in this figure, but see FIG. 3) which are in turn in fluid communication with a terminal end of a vehicle HVAC duct 112 (see FIG. 3). Thus, conditioned air from the HVAC system 110 (not shown) passes through the air register 106 and therefrom into the vehicle passenger cabin 102 (not shown). The air register 106 further includes a shut-off door 134 (see FIG. 4B) adapted to allow or prevent an airflow of conditioned air from the HVAC system 110 therethrough. The shut-off door 134 is pivotally attached to a rear portion of the air register 106 and can be translated between a closed configuration preventing airflow through the air register and an open configuration allowing airflow through the air register.

The plurality of vanes 132 are pivotally attached to a front portion of the air register 106 to control a direction of an airflow of conditioned air from the vehicle HVAC system 110 into a vehicle passenger cabin (not shown). In the depicted embodiment (see FIG. 4A), a portion of the plurality of vanes 132 (shown as 132a,b,c,d,e) are oriented substantially vertically to control a direction of airflow in a side-to-side direction, and another portion of the plurality of vanes 132 (shown as 132f,g,h,i) are oriented substantially horizontally to control a direction of airflow in an up-down direction. The substantially vertically oriented vanes 132a, b,c,d,e may be adapted for simultaneous pivoting, such as by a link 133 (not visible in this view, but see FIG. 4B) interconnecting each vane. Likewise, the substantially horizontal vanes 132f,g,h,i may be adapted for simultaneous pivoting, such as by a link 135 interconnecting each vane.

The plurality of vanes 132 and the shut-off door 134 are adapted for automated control, i.e. for pivoting about an axis under the control of an actuator. Specifically, the vertical vanes 132a,b,c,d,e are pivotally controlled by a first actuator 136, the horizontal vanes 132f,g,h,i are pivotally controlled by a second actuator 138, and the shut-off door 134 is pivotally controlled by a third actuator 140. As described above, each actuator 136, 138, and 140 is under direct or indirect control of the controller 128, which in turn is in operative communication with the HMI 114 (see FIG. 3).

The actuators 136, 138, and 140 may be servomotors of known design, adapted to pivot the respective vanes 132a, b,c,d,e and 132f,g,h,i and the shut-off door 134 about an axis. The motors may be directly connected to a pivot point of a one of the vertical vanes 132a,b,c,d,e, the horizontal vanes 132f,g,h,i, and the shut-off door 134, or may be indirectly connected such as by a rack and pinion gearing system. Such assemblies are known in the air register arts. Of course, other systems for automatically controlling vanes and shut-off doors of an air register are known, and are contemplated for use herein.

As will be appreciated, the vanes 132a,b,c,d,e and 132f, g,h,i and the shut-off door 134 will have a needed degrees of rotation to translate between a fully open and a fully closed configuration, and accordingly actuators 136, 138, and 140 will be selected or adapted to provide a maximum travel corresponding to those needed degrees of rotation. In one possible embodiment, actuator 140 may provide rotation from 0 degrees to 75 degrees, the actuator 136 may provide rotation from −83 degrees to 44 degrees, and the actuator 138 may provide rotation from −31 degrees to 46 degrees. Of course, these values may require modification according to air register 106 dimensions, vane 132 size, etc.

In one possible embodiment, control of the air registers 106 (as well as controlling features of the HVAC system 110 such as the air-conditioning, heating, ventilation, etc.) may be accomplished by way of a suitable app accessible by way of the HMI 114 and synchronized with the controller 128 by any suitable wired or wireless means, such as BLUETOOTH®. While the elements of the air registers 106 are uniformly automated by way of the devices and systems described above, both manual (user-actuated) and automatic control schemes are contemplated for control of the air registers 106, i.e. pivoting the vanes 132a,b,c,d,e and 132f, g,h,i to alter a direction of airflow as desired and/or pivoting the shut-off door 134 to allow or prevent an airflow through an air register 106.

Figure 5A:
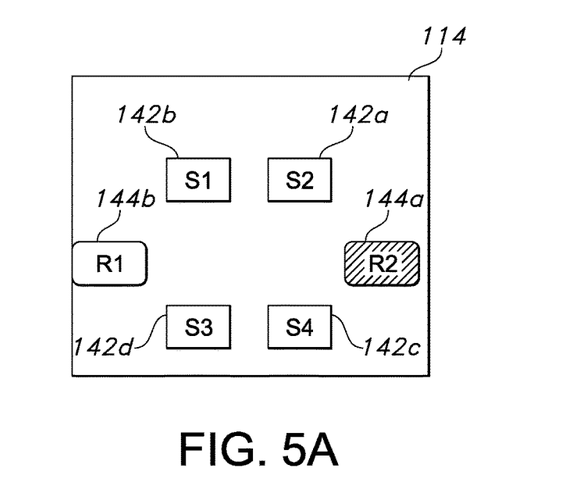
FIG. 5A illustrates a representative touch screen display for user-actuated control of the air register of FIGS. 4A-4B.
Figure 5B:
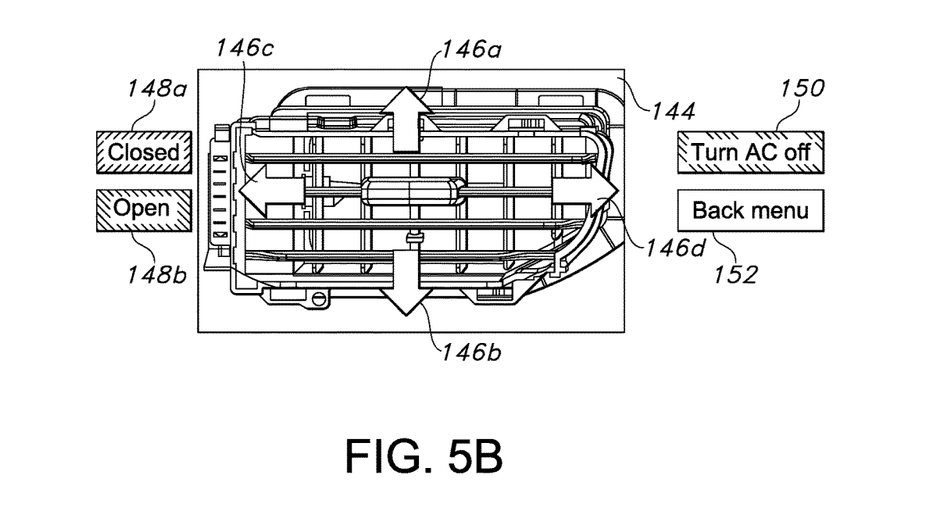
FIG. 5B illustrates another representative touch screen display for user-actuated control of the air register of FIGS. 4A-4B.

In one possible embodiment of a manual or user-actuated control scheme, FIGS. 5A and 5B illustrate representative display screens for HMI 114 showing buttons/icons whereby a user may select particular air registers 106 for control and control particular elements of the selected air register. As described above and as illustrated in FIG. 1, HMI 114 could be a touch screen 118 of a control panel 116, a touch screen 122 of a user's mobile device 120, or touch screens 126a-d of passenger seat control panels 124a-d. The image of FIG. 5A is representative of the seat 104 and air register 106 arrangement shown in FIG. 1, including four icons 142a-d corresponding to passenger seats 104a-d and two icons 144a, b corresponding to air registers 106a, b. In the illustrated embodiment, passenger P1 has vacated seat 104b and moved to seat 104d as shown in FIG. 2.

To control the desired air register 106a, the user (not shown) touches icon 144a. This action in turn brings up an image representative of air register 106a, with various additional icons for controlling elements of the air register. These may include arrow icons (or other suitable icons) 146a-d which respectively signal, by way of controller 128, actuators 138 and 138 to control a left/right pivoting motion of the vertical vanes 132a,b,c,d,e and an up/down pivoting motion of the horizontal vanes 132f,g,h,i. As an example, touching arrow 146a once may cause actuator 138 to rotate horizontal vanes 132f,g,h,i through a particular degree of rotation, for example rotating the vanes 5 degrees to change the direction of airflow exiting that air register 106, whereas touching arrow 146b will have the opposite effect, i.e. cause rotation of horizontal vanes 132f,g,h,i −5 degrees. Likewise, touching arrow 146d may cause actuator 136 to rotate vertical vanes 132a,b,c,d,e through a particular degree of rotation, for example 5 degrees, whereas touching arrow 146c may have the opposite effect, i.e. rotating vertical vanes 132a,b,c,d,e −5 degrees. Of course, as described above different degrees of rotation may be possible. Alternatively, the system may be configured to cause continuous rotation of the vanes 132 in the desired direction as described, at least through the allowable degrees of rotation, as long as the icons are being pressed.

Button icons (or other suitable icons) 148a,b may be included to signal, by way of controller 128, actuator 140 to control an open/closed pivoting motion of the shut-off door 134. In the depicted embodiment, touching the "shut-off door closed" button 148a will cause the actuator 140 to rotate as needed to translate the shut-off door 134 to a closed orientation, for example 75 degrees, terminating airflow through that air register 106. Touching the "shut-off door open" button 148b will cause the actuator 140 to rotate as needed to translate the shut-off door 134 to an open orientation, for example −75 degrees, allowing airflow through that air register 106. Alternatively, the system may be configured to cause continuous rotation of the shut-off door 134 in the desired direction, at least through the allowable degrees of rotation, as long as the icons are being pressed. Likewise, additional button icons (or other suitable icons) 150, 152 may be provided to control elements of the HVAC system (for example, AC on/off, fresh air on/off, heat on/off, etc.), to access additional menus, and others.

In the depicted embodiment, the function associated with a particular arrow icon 148a-d and button icon 148a,b is deactivated as soon as the respective vanes 132 and shut-off door 134 have reached their maximum allowable degree of rotation. So, for example, if the actuator 140/shut-off door 134 are at "full open," i.e. 0 degrees, and a user touches button icon 148b (open), the system will do nothing since the shut-off door is already open. On the other hand, touching button icon 148a (closed) will cause actuator 140/shut-off door 134 to rotate 75 degrees to the "full closed" position. At that point, button icon 148a will be deactivated and only button icon 148b can be used. The same would be true of arrow icons 146a-d and vertical vanes 132a,b,c,d,e/horizontal vanes 132f,g,h,i.

Figure 6A:
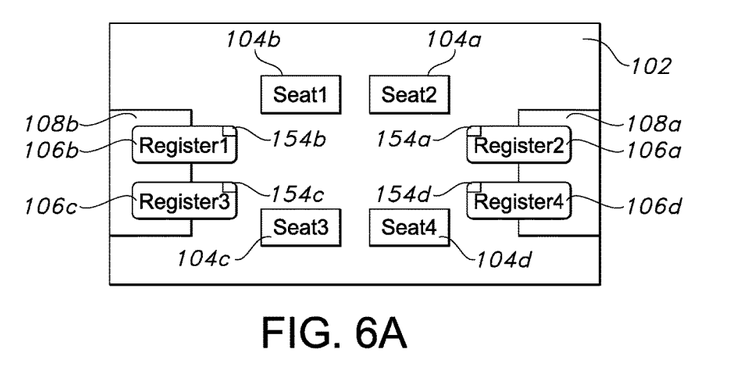
FIG. 6A illustrates a representative touch screen display for automated control of the air register of FIGS. 4A-4B.
Figure 6B:
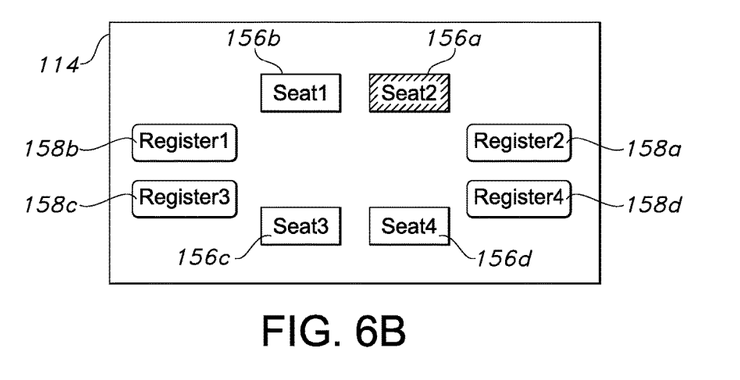
FIG. 6B shows the representative touch screen display of FIG. 6A, wherein a particular passenger seat has been identified as occupied.
Figure 6C:
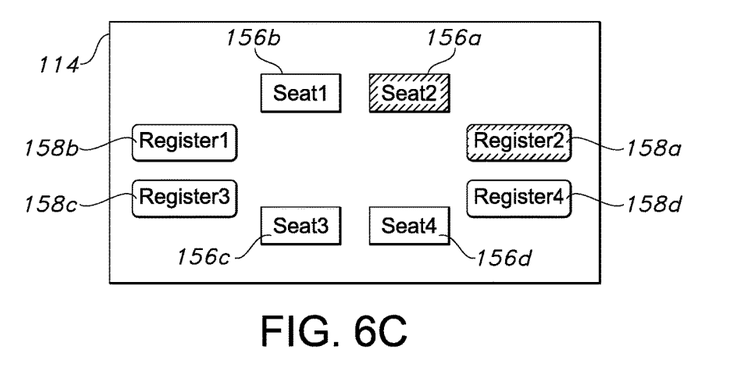
FIG. 6C shows the representative touch screen display of FIG. 6A, wherein a particular air register has been selected for control according to the determination of seat occupancy of FIG. 6B.

In another embodiment shown in FIGS. 6A-C, an automatic control scheme for air registers 106 is contemplated. In the depicted embodiment (see FIG. 6A), the passenger cabin 102 arrangement is four passenger seats 104a-d facing one another, and four air registers 106a-d each associated with a B-pillar 108a,b (not shown). Further, imagers 154 are disposed near the air registers 106a-d. In the depicted embodiment, imagers 154a-d are disposed near the air registers 106a-d. The imagers 154a-d may be directly associated with their respective air registers 106a-d, such as in or on a housing or bezel associated with the air registers, or may be positioned on or in the B-pillar or B-pillar trim (not shown) adjacent to their respective air registers. The imagers 154 may be conventional Web cams or other suitable imager as is known for use in automotive applications, in communication directly or indirectly with controller 128. In the depicted embodiment, the imagers 154 are fixed, i.e. have a predetermined and unchanging field of view of one or more passenger seats 104a-d. Likewise, in the depicted embodiment of the automatic control scheme each air register 106a-d will be assigned to a nearest seat 104a-d (although a user could override the automatic control system such as by using the user-actuated system described above to direct all registers to a single seat 104, for example). Thus, the system will always be able to determine which of passenger seats 104a-d are nearest to a particular imager 154a-d and also which seats 104a-d are occupied.

A user may be able to select a particular seat 104a-d which she is occupying or intends to occupy, such as by a button icon 156a-d displayed by HMI 114 (see FIG. 6B) showing that seat 104a is occupied. Alternatively, the determination of an occupied passenger seat 104a-d may be implemented automatically, such as by a suitable seat-associated occupancy sensor communicating with controller 128. Such occupancy sensors are known in the art, and can be as simple as pressure switches mounted in seats 104a-d or as complex as proximity sensors. In yet another embodiment, the determination of an occupied passenger seat 104a-d could be implemented via detection by a closest one of imagers 154a-d. In turn, air registers 106a-d are likewise represented by icons 158a-d. FIG. 6C shows HMI 114, indicating that seat 104a is occupied or intended to be occupied, and therefore that register 106a should be active.

Once a particular register is active, i.e. register 106a represented by icon 158a in FIG. 6C, imager 154a associated with that register 106a is likewise activated, and can detect a portion of a seat occupant. Suitable computer vision software adapted for identifying and tracking a portion of an individual's body is known in the art, and can be incorporated in controller 128 or a separate controller operatively associated with controller 128. As non-limiting examples, examples of such software are described in: Dantone, M, Real Time Detection of Human Body and Face Parts, Ph.D. Dissertation, ETH Zurich, 2014; Plagemann et al., Real-time Identification and Localization of Body Parts from Depth Images, Stanford.edu/~plagem/publ/icra10; Lee et al., Body Part Detection for Human Pose EEstimation and Tracking, IEEE Workshop on Motion and Video Computing (WMVC '07). If no occupant can be detected, the register 106a and associated imager 154a can be deactivated by controller 128. Of course, it will be appreciated that more than one register 106/imager 154 may be assigned to a particular seat 104.

In one embodiment, a "follow me" option may be implemented either as a default setting or by user selection whereby only a register 106 closest to an occupied seat is activated, but specific settings of the vertical and horizontal vanes 132 are controlled by the user using HMI 114. For example, continuing the above example where a passenger begins a trip in seat 104a, register 106a would be activated. If the passenger changes seats to seat 104c, register 106a/imager 154a and imager 154c would follow that change, and register 106a would be automatically deactivated, i.e. controller 128 would provide a command to actuator 140 to translate shut-off door 134 to the fully closed orientation as described above. Concomitantly, by the presence of the passenger in seat 104c would cause controller 128 to activate register 106c, i.e. open register 106c shut-off door 134 to the fully open orientation described above.

In another possible embodiment, if the "follow me" option were deactivated, the imagers 154a-d associated with registers 106a-d would always be fixed respectively on a specific passenger seat 104a-d. When a passenger left a particular seat to occupy a different seat, for example from seat 104a to seat 104c as described above, the system default setting would be to require the user to deactivate register 106a and activate register 106c via HMI 114.

Instead of a user controlling vanes 132 via HMI 114 as described above, the vanes can be automatically controlled according to a position of a user body part. In the embodiment depicted in FIGS. 7A-7B, the imagers 154 are using a passenger's head 160 as a focus point. However, equally the passenger's torso or legs could be used as the focus point, according to the user's personal preference of what body part to focus the HVAC system 110 airflow on. As described above, suitable computer vision software adapted for identifying, distinguishing, and tracking individual portions of an individual's body such as the head, torso, and legs is known in the art, and can be incorporated in controller 128 or a separate controller operatively associated with controller 128. This zonal airflow control could also be provided as an option for selection by a user via icons displayed by HMI 114.

Figure 7A:
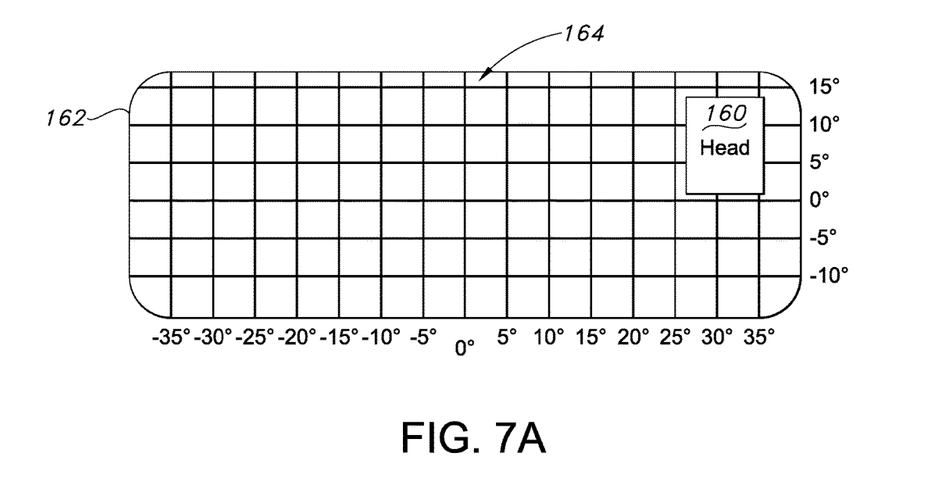
FIG. 7A illustrates use of a system for tracking movement of a passenger and automatically keeping an airflow from a register according to FIGS. 4A and 4B flowing towards that passengers' head.
Figure 7B:
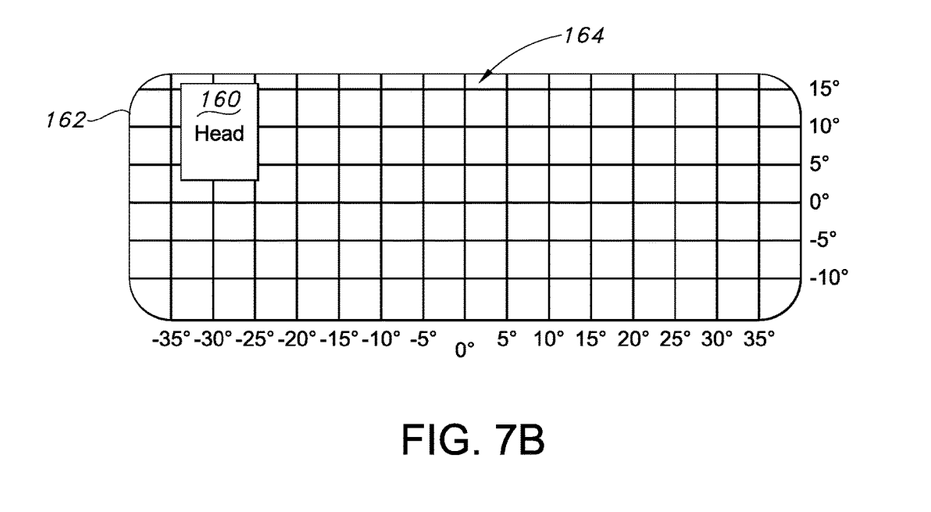
FIG. 7B illustrates the system of 7A tracking movement of the passenger's head.

FIGS. 7A-7B show the field of view 162 of each imager 154. As shown in the drawing, to allow tracking of a body part controller 128 or a dedicated controller in communication with controller 128 overlays a grid 164 comprising vertical and horizontal lines, each line corresponding to a degree of rotation of the vertical vanes 132a,b,c,d,e and the horizontal vanes 132f,g,h,i of each air register 106. As shown the grid lines are provided in increments of 5 degrees corresponding to the 5 degree increments of rotation of the vertical vanes 132a,b,c,d,e and the horizontal vanes 132f,g,h,i that are provided by actuators 136, 138 under the control of controller 128 as described above. However, as will be appreciated the degree of rotation of the described vanes may vary by vehicle model, vane size, etc., and therefore the absolute value of the degrees of rotation represented by the grid lines will also vary. However, the grid lines will always correspond to the degree of rotation of the degree of rotation of the vertical vanes 132a,b,c,d,e and the horizontal vanes 132f,g,h,i of each air register 106.

As will also be appreciated, for each of the sets of vertical and horizontal lines, 0 degrees represents a "full open" orientation of the vertical vanes 132a,b,c,d,e and the horizontal vanes 132f,g,h,i. For up/down airflow control via horizontal vanes 132f,g,h,i, the grid lines represent from 0 degrees to 15 degrees ("full up") of rotation, and from 0 degrees to −15 degrees ("full down") of rotation. Likewise, for left/right airflow control via vertical vanes 132a,b,c,d,e, the grid lines represent from 0 degrees up to 35 degrees ("full right") of rotation and from 0 degrees to −35 degrees ("full left") of rotation.

Because the imagers 154 are fixed and therefore the field of view of each imager does not change, the grid 164 position need never be changed—the only change registered by the system is the position of the passenger's head 160. Thus, for example, with the passenger's head 160 in the position shown in FIG. 7A, according to the position of the head in the grid 164 the controller 128 causes actuators 136, 138 horizontal vanes 132f,g,h,i to rotate to 5 degrees and vertical vanes 132a,b,c,d,e to rotate to 35 degrees. If the passenger has shifted positions, according to the position of the passenger's head 160 in the grid 164 as shown in FIG. 7B, the controller 128 causes actuators 136, 138 horizontal vanes 132f,g,h,i to rotate to 10 degrees and vertical vanes 132a,b,c,d,e to rotate to −30 degrees to keep an airflow from air register 106 focused on the passengers head.

Obvious modifications and variations are possible in light of the above teachings. All such modifications and variations are within the scope of the appended claims when interpreted in accordance with the breadth to which they are fairly, legally and equitably entitled.

What is claimed:

1. A method for controlling an airflow in a passenger cabin of an autonomous vehicle, comprising:
by way of a human-machine interface (HMI) included in a device selected from the group consisting of a central control panel, a plurality of passenger-seat-mounted control panels, and a plurality of user-carried mobile devices, providing an input indicative of an occupied passenger seat to a controller comprising a processor, memory, and storage, the controller being in operative communication with a power-actuated air register; and
by the controller, redirecting an airflow from the power-actuated air register towards the occupied passenger seat;
wherein the method further includes configuring the controller to, by way of the HMI:
 i) display a set of icons whereby the input indicative of the occupied passenger seat is provided; and
 ii) display another set of icons whereby a plurality of power-actuated airflow-directing elements of the power-actuated air register is controlled.

2. The method of claim 1, including selecting the plurality of power-actuated airflow-directing elements of the power-actuated air register from one or more of a plurality of substantially vertically-oriented pivoting vanes, a plurality of substantially horizontally-oriented pivoting vanes, and a power-actuated air register shut-off door.

3. The method of claim 2, further including providing at least one imager in communication with the controller and disposed adjacent to the power-actuated air register, the at least one imager being configured to provide an image of a selected portion of a passenger to the controller.

4. The method of claim 3 including, by the controller, orienting the image of the selected portion of the passenger on a grid comprising a plurality of vertical and horizontal grid lines, each vertical and horizontal grid line respectively corresponding to a degree of motion of the plurality of substantially vertically-oriented vanes and the substantially horizontally-oriented vanes, to determine an orientation of the plurality of substantially vertically-oriented vanes and the substantially horizontally-oriented vanes and/or a movement of the selected portion of the passenger.

5. The method of claim 4, including, by the controller, pivoting at least one of the plurality of substantially vertically-oriented vanes and the plurality of substantially horizontally-oriented vanes to direct an airflow from the power-actuated air register towards the selected portion of the passenger.

6. The method of claim 4, further including, on determining by the controller that the selected portion of the passenger has moved from a first passenger seat to a second passenger seat:
 i) by the controller, translating the shut-off door of a power-actuated air register closest to the first passenger seat to a closed position;
 ii) by the controller, translating the shut-off door of a power actuated air register closest to the second passenger seat to an open position; and
 iii) by the controller, pivoting at least one of the plurality of substantially vertically-oriented vanes and the plurality of substantially horizontally-oriented vanes of the power-actuated air register closest to the second passenger seat to direct an airflow towards the selected portion of the passenger's body.

7. A system adapted to control an airflow in a passenger cabin of an autonomous vehicle, comprising:
a plurality of power-actuated air registers;
a controller comprising a processor, memory, and storage in operative communication with the plurality of power-actuated air registers; and
a human-machine interface (HMI) included in a device selected from the group consisting of a central control panel, a plurality of passenger-seat-mounted control panels, and a plurality of user-carried mobile devices, the HMI further being in communication with the controller and comprising a touch screen adapted for providing inputs to the controller indicative of an occupied passenger seat;
wherein the controller is configured at least to: 1) direct an airflow from one or more of the plurality of power-actuated air registers toward the occupied passenger seat on receiving the inputs; and to 2) by way of the HMI:
 i) display a set of icons whereby the input indicative of the occupied passenger seat is provided; and
 ii) display another set of icons whereby a plurality of power-actuated airflow-directing elements of the plurality of power-actuated air registers is controlled, the plurality of power-actuated airflow-directing elements being selected from one or more of a plurality of substantially vertically-oriented pivoting vanes, a plurality of substantially horizontally-oriented pivoting vanes, and a power-actuated air register shut-off door.

8. The system of claim 7, further including at least one imager in communication with the controller and disposed adjacent to each one of the plurality of power-actuated vehicle air registers, the at least one imager being configured to provide an image of a selected portion of a passenger to the controller.

9. The system of claim 8, wherein the controller is further configured to orient the image of the selected portion of the passenger on a grid comprising a plurality of vertical and horizontal grid lines, each vertical and horizontal grid line respectively corresponding to a degree of motion of the plurality of substantially vertically-oriented vanes and the plurality of substantially horizontally-oriented vanes, to determine an orientation of the plurality of substantially vertically-oriented vanes and the substantially horizontally-oriented vanes and/or a movement of the selected portion of the passenger.

10. The system of claim 9, wherein the controller is further configured to pivot at least one of the plurality of substantially vertically-oriented vanes and the plurality of substantially horizontally-oriented vanes to direct an airflow from the power-actuated vehicle air register towards the selected portion of the passenger.

11. The system of claim 9, wherein the controller is further configured to, on determining that the selected portion of the passenger has moved from a first passenger seat to a second passenger seat:
 i) translate the shut-off door of a power-actuated vehicle air register closest to the first passenger seat to a closed position;
 ii) translate the shut-off door of a power actuated vehicle air register closest to the second passenger seat to an open position; and
 iii) pivot at least one of the plurality of substantially vertically-oriented vanes and the plurality of substantially horizontally-oriented vanes of the power-actuated vehicle air register closest to the second passenger seat to direct an airflow towards the selected portion of the passenger.

12. A system adapted to control an airflow in a passenger cabin of an autonomous vehicle, comprising:
 a plurality of power-actuated air registers each disposed on or in a B-pillar or a B-pillar trim piece of the autonomous vehicle and each comprising a plurality of power-actuated airflow-directing vanes and a power-actuated shut-off door;
 a controller comprising a processor, memory, and storage in operative communication with the plurality of power-actuated air registers;
 a human-machine interface (HMI) in communication with the controller and comprising a touch screen adapted for providing inputs to the controller indicative of an occupied passenger seat; and
 at least one imager disposed on or in the B-pillar or a B-pillar trim piece and in communication with the controller and disposed adjacent to each one of the plurality of power-actuated vehicle air registers, the at least one imager having a fixed field of view and being configured to provide to the controller an image of a selected portion of a passenger that is positioned in the occupied passenger seat;
 wherein the controller is configured to orient the image of the selected portion of the passenger to a grid comprising a plurality of vertical and horizontal grid lines, each vertical and horizontal grid line respectively corresponding to a degree of motion of the plurality of power-actuated airflow-directing vanes and, on determining a movement of the selected portion of the passenger from a first passenger seat to a second passenger seat:
 i) translate a shut-off door of a power-actuated vehicle air register closest to the first passenger seat to a closed position;
 ii) translate a shut-off door of a power actuated vehicle air register closest to the second passenger seat to an open position; and
 iii) pivot the plurality of power-actuated airflow-directing vanes closest to the second passenger seat to direct an airflow towards the selected portion of the passenger;
 further wherein the controller is further configured to, by way of the HMI:
 i) display a set of icons whereby the input indicative of the occupied passenger seat is provided; and
 ii) display another set of icons whereby one or both of the plurality of power-actuated airflow-directing vanes and the power-actuated shut-off door are controlled.

* * * * *